(12) United States Patent
Mita et al.

(10) Patent No.: US 7,920,722 B2
(45) Date of Patent: Apr. 5, 2011

(54) OCCUPANT DETECTION APPARATUS

(75) Inventors: Hirofumi Mita, Minato-ku (JP); Hiroshi Aoki, Minato-ku (JP); Masato Yokoo, Minato-ku (JP); Yuu Hakomori, Minato-ku (JP)

(73) Assignee: Takata Corporation, Tokyo (JP)

( * ) Notice: Subject to any disclaimer, the term of this patent is extended or adjusted under 35 U.S.C. 154(b) by 806 days.

(21) Appl. No.: 11/984,510

(22) Filed: Nov. 19, 2007

(65) Prior Publication Data

US 2008/0116680 A1 May 22, 2008

(30) Foreign Application Priority Data

Nov. 22, 2006 (JP) .................................. 2006-316138

(51) Int. Cl.
*G06K 9/00* (2006.01)
(52) U.S. Cl. ............................ 382/104; 348/148; 701/45
(58) Field of Classification Search .................. 382/103, 382/104, 154, 168, 218, 282; 348/143, 148; 340/457.1, 573.1; 701/45
See application file for complete search history.

(56) References Cited

U.S. PATENT DOCUMENTS

| 5,835,613 | A | 11/1998 | Breed et al. | 382/100 |
|---|---|---|---|---|
| 5,983,147 | A | 11/1999 | Krumm | 701/45 |
| 6,480,616 | B1 | 11/2002 | Hata et al. | 382/106 |
| 6,493,620 | B2 | 12/2002 | Zhang | 701/45 |
| 2004/0085448 | A1 | 5/2004 | Goto et al. | 384/148 |
| 2004/0153229 | A1 | 8/2004 | Gokturk et al. | 701/45 |
| 2005/0002545 | A1* | 1/2005 | Yasui et al. | 382/104 |
| 2006/0291697 | A1* | 12/2006 | Luo | 382/104 |
| 2007/0229661 | A1 | 10/2007 | Aoki et al. | 384/148 |
| 2007/0229662 | A1 | 10/2007 | Aoki et al. | 348/148 |

FOREIGN PATENT DOCUMENTS

| JP | 2003-281551 A | 10/2003 |
|---|---|---|
| JP | 2003-294855 A | 10/2003 |
| JP | 2004-246827 A | 9/2004 |
| JP | 2005-257327 A | 9/2005 |
| WO | WO 03/089277 A1 | 10/2003 |
| WO | WO 2006/027032 A1 | 3/2006 |

* cited by examiner

*Primary Examiner* — Andrew W Johns
(74) *Attorney, Agent, or Firm* — Foley & Lardner LLP

(57) ABSTRACT

An occupant detection apparatus can include a photographing device disposed to face to a vehicle rear seat for taking three-dimensional images; an information extracting section which extracts image information corresponding to an upper area of a seat of the rear seat from three-dimensional images taken by the photographing device; a division processing section which divides information extracted by the information extracting section into areas relating to respective sitting areas for occupants sitting in the rear seat; and a derivation processing section which derives, with regard to histogram showing frequency distribution of picture elements relative to distances from the photographing device, a first histogram corresponding to image information divided by the division processing section and also derives a difference histogram by deriving a second histogram from the derived first histogram, and thus derives information about each rear-seat occupant in each sitting area of said vehicle rear seat based on the difference histogram.

11 Claims, 7 Drawing Sheets

OCCUPANT DETECTION APPARATUS

BACKGROUND

The present invention relates generally to occupant detection technology to be installed in a vehicle and, more particularly, a technology for detecting information about a rear-seat occupant sitting in a rear seat of a vehicle.

Conventionally, various techniques are known for detecting an object occupying a vehicle seat by using a photographing means such as a camera. For example, disclosed in Japanese Patent Application No. 2006-316138 is a configuration of an occupant detection apparatus in which a camera capable of two-dimensionally photographing an object is arranged in front of a vehicle occupant to detect the position of the vehicle occupant by the camera.

Seat belt apparatuses may be attached to a vehicle rear seat for restraining an occupant. With such apparatuses, for example, there is a demand to increase the seat belt wearing rate by rear-seat occupants. To serve this demand, the vehicle may detect precise information about a rear-seat occupant that may be actually sitting in the vehicle rear seat. Technology for detecting the information regarding a rear-seat occupant may also be effective for a seat belt apparatus for the rear-seat occupant, a drive assist apparatus, etc.

However, it is difficult to precisely detect desired information about a rear-seat occupant when using a camera to two-dimensionally photograph a vehicle occupant, for example as with the detecting apparatus disclosed in Japanese Patent Application No. 2006-316138. When there is a small difference in color between the background and a rear-seat occupant or a small difference in color between the skin and the clothes, a problem arises that makes it difficult to securely detect the rear-seat occupant. Therefore, there is a need to provide a technology that is effective for more precisely detecting information about a rear-seat occupant sitting in a vehicle rear seat.

SUMMARY

Though the present invention is typically adapted to an occupant detection apparatus in an automobile for detecting information about a rear-seat occupant sitting in a vehicle rear seat, the present invention can be also adapted to an occupant detection apparatus in a vehicle other than an automobile.

An occupant detection apparatus may include a photographing device and a control device or means that includes an information extracting section, a division processing section, and a derivation processing section.

The photographing device can be disposed to face a vehicle rear seat in a vehicle cabin for taking three-dimensional images. The photographing device may be a 3-D type monocular C-MOS camera, a 3-D type pantoscopic stereo camera, or a laser scanner. The mounting place for the photographing device may be any place facing the vehicle rear seat and an area around an inner rearview mirror. There may be one or more mounted photographing device(s). The vehicle rear seat may include various vehicle seats arranged in a rear-side portion of a vehicle. The vehicle rear seat may be one or more seats in the second row from the front (in the case of a two row layout) or all seats except seats in the first row from the front in a layout of more than two rows.

The information extracting section extracts image information corresponding to an upper area of a seat back of the vehicle rear seat from the three-dimensional images taken by the photographing device. Since the three-dimensional images contain distance information taken by the photographing device, it is possible to extract information according to distance, thereby precisely extracting image information corresponding to the upper area of the seat back of the vehicle rear seat. The upper area of a seat back generally is an area corresponding to an upper area of the seat back and is an area that is effective in obtaining information about rear-seat occupants sitting in the vehicle rear seat because this area is rarely interrupted by front-seat occupants sitting in the vehicle front seats, for example. The upper area of the seat back is typically an area defined by a horizontal plane extending through the shoulders of the occupant sitting in the vehicle rear seat, a horizontal plane extending above the head of the rear-seat occupant sitting in the vehicle rear seat, a vertical plane extending in front of the head of the rear-seat occupant sitting in the vehicle rear seat, a vertical plane extending behind the head of the rear-seat occupant sitting in the vehicle rear seat, and vertical planes extending on right and left sides of the seat back of the vehicle rear seat.

The division processing section has a function of dividing the image information extracted by the information extracting section into regions relating to respective sitting areas of rear-seat occupants sitting in the vehicle rear seat. Specifically, in a vehicle rear seat with a passenger capacity of two, the image information extracted by the information extracting section is divided into two regions. In a vehicle rear seat with a passenger capacity of three, the image information extracted by the information extracting section is divided into three regions.

The derivation processing section derives a first histogram corresponding to the image information. The image information can include picture elements that correspond to objects imaged by the photographing device. The first histogram can show a frequency distribution of picture elements relative to distances that correspond to lengths between the imaged objects and the photographing device. The first histogram is divided by the division processing section and a difference histogram is obtained by deducting a second histogram (previously defined where the vehicle rear seat is unoccupied) from the derived first histogram. A picture element may correspond to a pixel which is a colored point as a unit composing a digital image, and may contain information about distance (depth), degree of transparency, and the like. A digital image is represented by an image sheet composed of square or rectangular pixels which are aligned orderly lengthwise and crosswise. The histogram shows frequency distribution of picture elements relative to distances from the photographing device, with an abscissa axis representing the distances from the photographing device and an ordinate axis representing the frequency (number) of picture elements corresponding to the distance from the photographing device.

The derivation processing section derives information about each rear-seat occupant in each sitting area of the vehicle rear seat based on the difference histogram. The sum of differences in the difference histogram at a position where the rear-seat occupant is seated within a predetermined range from the photographing device (e.g., the frequency of picture elements in the predetermined range from the photographing device corresponds to the volume of an object detected in the sitting area) is used to determine whether or not there is a rear-seat occupant in each sitting area of the vehicle rear seat. This determination may be the result of a comparison of the volume of the detected object to a preset value which is previously set as the volume corresponding to an occupant. When the volume of the detected object exceeds the preset value or is equal to or more than the preset value, it is determined that the detected object contains a rear-seat occupant, that is, the rear-seat occupant is seated. On the other hand, when the volume of the detected object is equal to or less than the preset value or is below the preset value, it is determined that the object does not contain a rear-seat occupant, that is, no rear-seat occupant is seated.

In the present invention, the function of obtaining the differential histogram may be conducted by another processing section besides the determination processing section.

According to the arrangement of the occupant detection apparatus, it is possible to precisely detect whether or not there is a rear-seat occupant in each sitting area of the vehicle rear seat by conducting the respective processes based on three-dimensional images taken by the photographing device. The information extracting section extracts image information corresponding to the upper area of the seat back of the vehicle rear seat from the three-dimensional images taken by the photographing device, thereby reducing the load for image processing.

The previously determined information about whether or not there is a rear-seat occupant may be used for controls of vehicular assist in a seat belt apparatus for restraining the rear-seat occupant by a seat belt in the event of a vehicle collision and/or an air bag apparatus for restraining the rear-seat occupant by an airbag in the event of a vehicle collision.

An operation device control system may include an occupant information detecting device for detecting information about a rear-seat occupant sitting in a vehicle rear seat; and an operation device which is actuated according to the detection result of the occupant information detecting device. In the operation device control system, the occupant information detecting device is composed of an occupant detection apparatus, such as the photographing device discussed above, and the operation device is actuated according to the determination results determined by the determination processing section. Specifically, the operation device may be a component of a seat belt apparatus for restraining the rear-seat occupant by a seat belt in the event of a vehicle collision, a component of an airbag apparatus for restraining the rear-seat occupant by an airbag which deploys in front of or on a side of the rear-seat occupant in the event of a vehicle collision, and/or a component of a device which rises a seat cushion of the vehicle rear seat in the event of a vehicle collision in order to prevent a phenomenon (the so-called "submarine phenomenon") in which a rear-seat occupant tends to slide along the seat surface below the seat belt.

The operation device can be actuated based on precisely detected information about the presence or absence of a rear-seat occupant in the vehicle rear seat so that this arrangement is effective for suitably actuating the operation device.

A seat belt system which is installed in a vehicle may include at least an occupant detection apparatus as discussed above; a seat belt which can be worn by a rear seat occupant sitting in a vehicle rear seat for restraining the rear-seat occupant, a seat belt buckle which is installed in each sitting area of the vehicle rear seat; a tongue which is attached to the seat belt and is latched with the seat belt buckle during the seat belt wearing state; and an informing section. The informing section informs of the position of at least one of the seat belt buckle and the tongue installed for each sitting area where an occupant is sitting based on a determination result by a determination processing section of the occupant detection apparatus. As the arrangement of the informing section, means of lightening the seat belt buckle itself and/or the tongue itself, protruding the seat belt buckle, sending out the tongue, sliding the tongue up and down, or displaying on a monitor panel may be employed.

According to the arrangement of the seat belt system, the rear-seat occupant sitting in the vehicle rear seat can be informed of the existence of the seat belt buckle and/or the tongue while the seat belt system uses the precisely detected information about the presence or absence of a rear-seat occupant in the vehicle rear seat. This can increase the recognition of the existence of the seat belt buckle and/or the tongue and is thus effective in increasing the seat belt wearing rate by rear-seat occupants.

In a seat belt system of a further aspect, the informing section has a function of informing of the positions of the seat belt buckle and the tongue when they are correctly latched with each other during the normal seat belt wearing state.

According to the arrangement of the seat belt system, it can prevent incorrect buckling, such as a case in which the tongue for the left side rear-seat occupant is latched with the seat belt buckle for the right side rear-seat occupant, which could inhibit the original occupant restraining function of the seat belt.

A seat belt system of another aspect may include at least an occupant detection apparatus as discussed above; a seat belt which can be worn by a rear seat occupant sitting in a vehicle rear seat for restraining the rear-seat occupant; a seat belt buckle which is installed in each sitting area of the vehicle rear seat; a tongue which is attached to the seat belt and is latched with the seat belt buckle during the seat belt wearing state; a buckle detecting sensor for detecting that the tongue is latched with the seat belt buckle; and an output device. The output device of the seat belt system outputs a "wearing" status of the seat belt installed in each sitting area where an occupant is sitting, based on determination result by a determination processing section of the occupant detection apparatus and the detection result by the buckle detecting sensor. The output device can be composed of a monitor panel or a meter panel capable of displaying the detection result or a speaker for outputting voice guidance.

The system can urge front-seat occupants including a driver and the rear-seat occupant(s) to wear the seat belt when the rear-seat occupant(s) sitting in the vehicle rear seat does not wear the seat belt by using the precisely detected information about the presence or absence of a rear-seat occupant in the vehicle rear seat. This may be effective in increasing the seat belt wearing rate by rear-seat occupants.

A vehicle may include an engine/running system; an electrical system; a vehicle control device; and an operation device control system, as mentioned above.

The engine/running system is a system involving an engine and a running mechanism of the vehicle. The electrical system is a system involving electrical parts used in the vehicle. The vehicle control device is a device having a function of controlling the actuation of the engine/running system and the electrical system.

According to an arrangement of the vehicle, the operation device can be actuated based on the precisely detected information about the presence or absence of a rear-seat occupant in the vehicle rear seat. Therefore, this arrangement may be effective in suitably actuating the operation device.

A vehicle of another aspect includes an engine/running system; an electrical system; a vehicle control device, and a seat belt apparatus.

The engine/running system is a system involving an engine and a running mechanism of the vehicle. The electrical system is a system involving electrical parts used in the vehicle. The vehicle control device controls the actuation of the engine/running system and the electrical system. The seat belt apparatus restrains a rear-seat occupant sitting in a vehicle rear seat by a seat belt and is composed of a seat belt system as mentioned above.

According to another embodiment, a vehicle may includes a seat belt apparatus capable of conducting controls using precisely detected information about the presence or absence of a rear-seat occupant in the vehicle rear seat by conducting respective processes based on three-dimensional images taken by the photographing device.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Hereinafter, embodiments of the present invention will be described with reference to drawings. First, an embodiment of an occupant detection apparatus 100 will be described with reference to FIG. 1.

Figure 1:
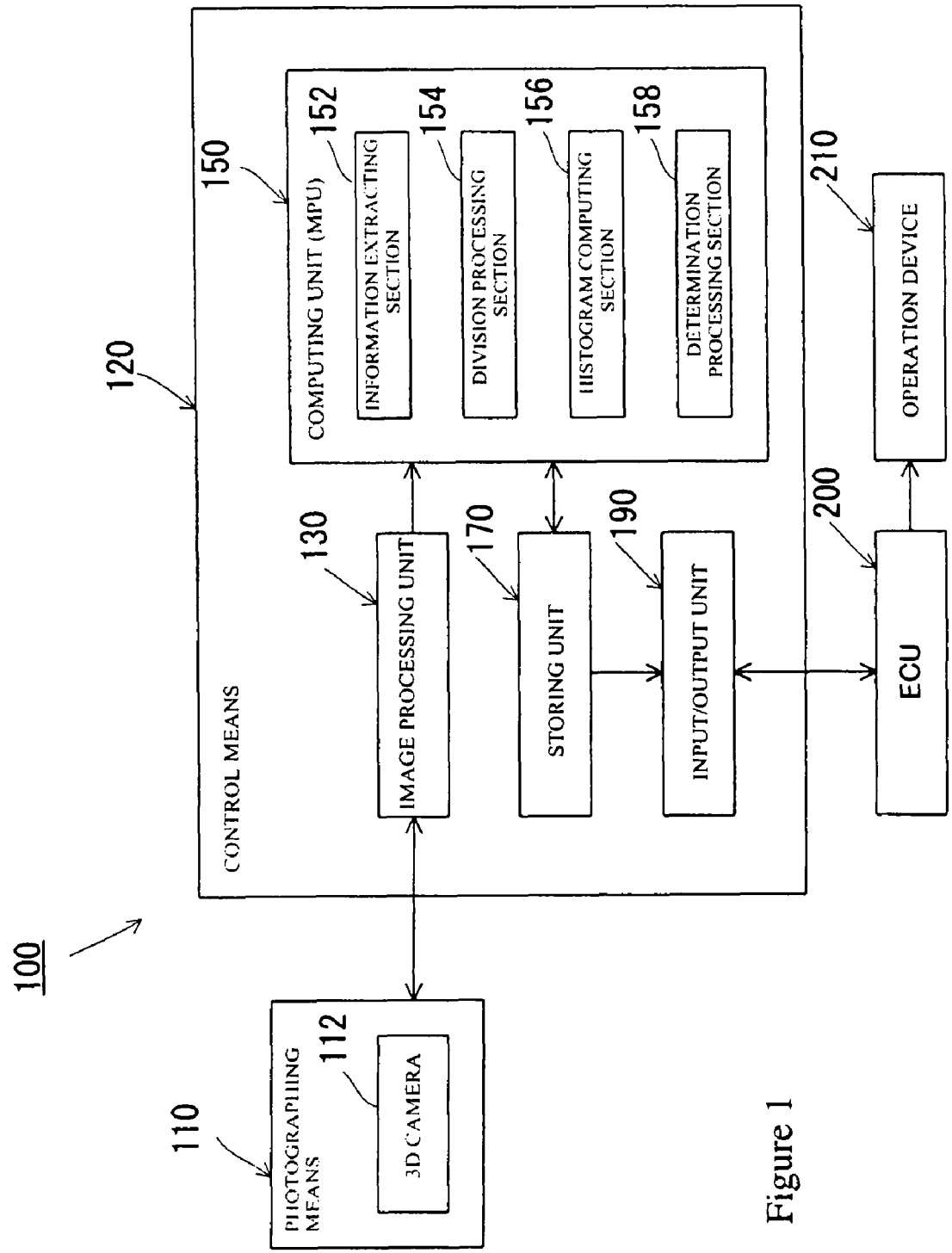
FIG. 1 is an illustration showing a system configuration of an occupant detection apparatus, which is installed in a vehicle, according to an exemplary embodiment.

A system configuration of an occupant detection apparatus 100, which is installed in a vehicle, of this embodiment is shown in FIG. 1. As shown in FIG. 1, the occupant detection apparatus 100 of this embodiment may be installed in an automobile (one type of vehicle) for detecting information about occupants and mainly comprises a photographing device or means 110 and a control device or means 120. Further, an occupant detection apparatus 100 may cooperate together with an ECU 200 as an actuation control device for the vehicle and an operation device 210 to form a vehicular assist system (an operation device control system and a seat belt system). A vehicle (not shown) may include an engine/running system involving an engine and a running mechanism of the vehicle, an electrical system involving electrical parts used in the vehicle, and a vehicle control device (ECU 200) for conducting the actuation control of the engine/running system and the electrical system.

The photographing device or means 110 of this embodiment may include a 3D camera 112 as the photographing device and a data transfer circuit. The 3D camera 112 can be a 3-D (three-dimensional) camera (sometimes called a monitor) of a C-MOS or CCD (charge-coupled device) type in which light sensors are arranged into an array (lattice) structure. With this camera three-dimensional images can be taken from a single view point. Thus, distances relative to the occupant are measured a plurality of times to detect a three-dimensional surface profile, thereby identifying the presence or absence, the size, the position, and the attitude of the occupant. As the 3D camera 112, a 3-D type monocular C-MOS camera or a 3-D type pantoscopic stereo camera may be employed. The photographing device or means 110 (the 3D camera 112) may be referred to as a photographing device which may be disposed to face to a vehicle rear seat in a vehicle cabin for taking three-dimensional images. Furthermore, a laser scanner capable of obtaining three-dimensional images may be employed instead of the 3D camera 112.

The camera 112 of this embodiment can be mounted to an area around an inner rearview mirror, an area around a side mirror, a central portion in the lateral direction of a dashboard, or the like in the automobile in such a manner as to face to a predetermined movement range in a vehicle rear portion. The predetermined movement range may be typically defined as a range including at least an area where the head and the upper body of a rear-seat occupant sitting in the rear seat may exist (an upper area of a seat back) in the passenger room of the vehicle cabin. This range may include a front-seat occupant and a front seat. By using the 3D camera 112, therefore, at least information about the rear-seat occupant sitting in the rear seat is measured periodically a plurality of times.

Figure 2:
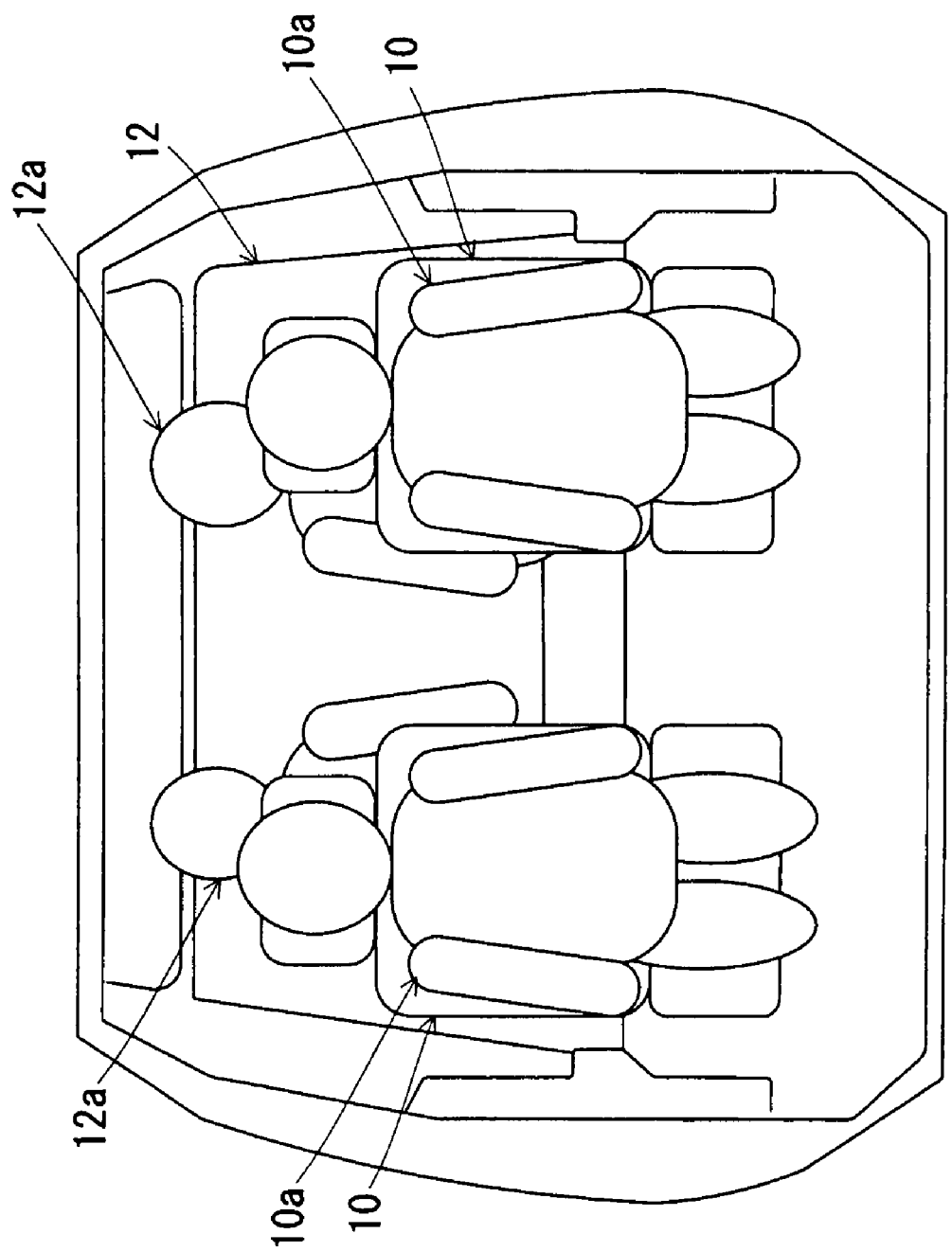
FIG. 2 is an illustration showing an example of the image taken by a 3D camera in the system of FIG. 1, according to an exemplary embodiment.

An exemplary image taken by the 3D camera 112 is shown in FIG. 2 as a reference. FIG. 2 shows an example of image taken by the 3D camera 112 of this embodiment. The example shown in FIG. 2 is an image showing partially viewed rear-seat occupants 12a sitting in a vehicle rear seat 12 behind front-seat occupants 10a sitting in vehicle front seats 10.

Mounted on the occupant detection apparatus 100 of this embodiment is a power source unit for supplying power from a vehicle buttery to the 3D camera 112, but not particularly shown. The camera 112 is set to start its photographing operation when the ignition key is turned ON or when a seat sensor (not shown) installed in the driver seat detects an occupant sitting in the driver seat.

The control device or means 120 of this embodiment further comprises at least an image processing unit 130, a computing unit (MPU) 150, a storing unit 170, an input/output unit 190, and peripheral devices (not shown). The control device or means 120 is structured as an occupant information processing system (CPU) for processing information about the occupant based on images taken by the 3D camera 112.

The image processing unit 130 is a device or means for controlling the camera to obtain good quality images and for controlling the image processing for processing images taken by the 3D camera 112 to be used for analysis. Specifically, as for the control of the camera, the adjustment of the frame rate, the shutter speed, and the sensitivity, and the accuracy correction are conducted to control the dynamic range, the brightness, and the white balance. As for the control of the image processing, the spin compensation for image, the correction for distortion of the lens, the filtering operation, and the difference operation as image preprocessing operations are conducted and the configuration determination and the trucking as image recognition processing operations are conducted.

The computing unit 150 of this embodiment comprises at least an information extracting section 152, a division processing section 154, a histogram computing section 156, and a determination processing section 158. As for the computing unit 150, some of the information extracting section 152, the division processing section 154, the histogram computing section 156, and the determination processing section 158 may be combined.

Figure 3:
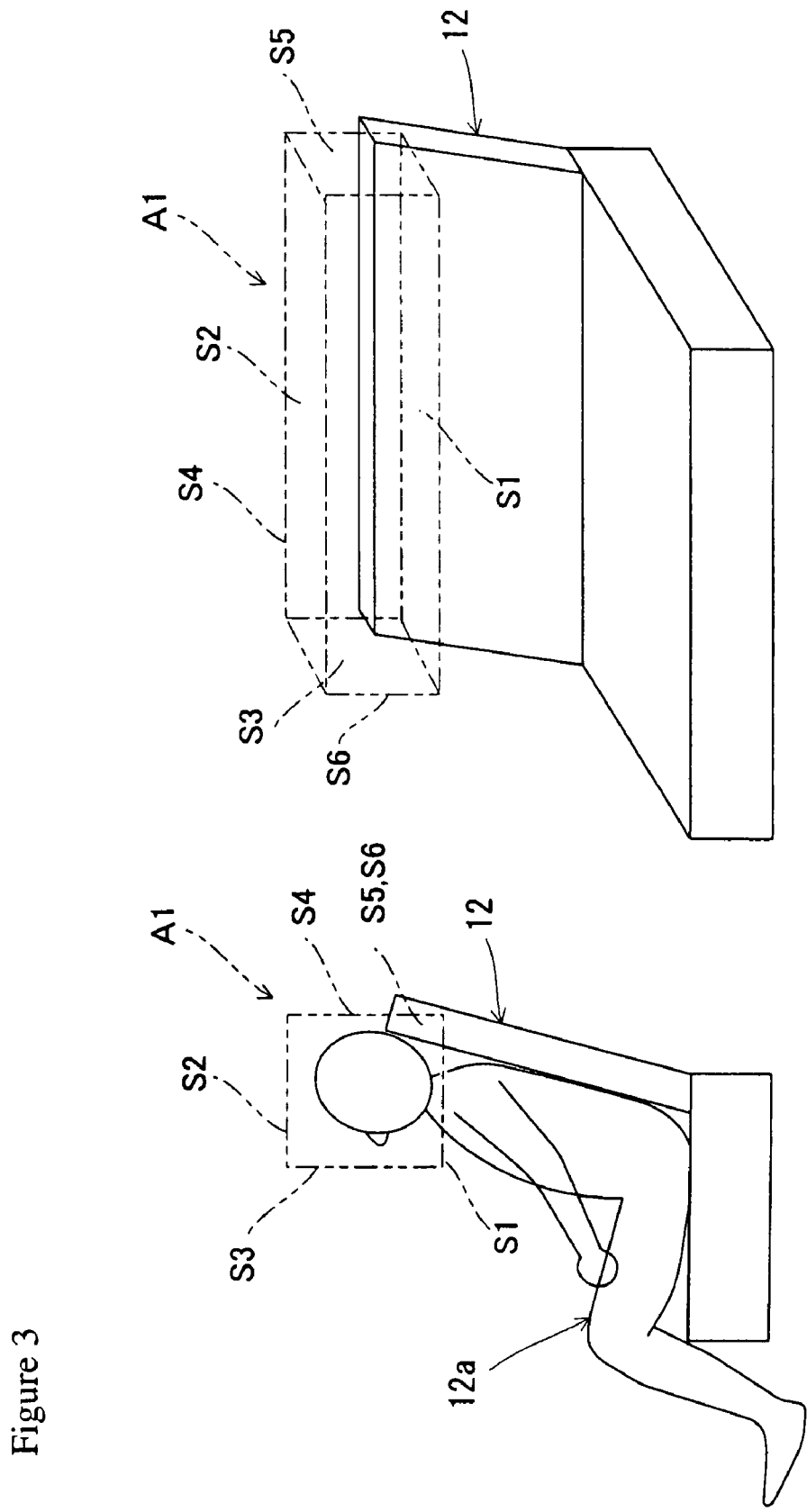
FIG. 3 is an illustration showing an area A1 defined as an upper area of a seat back by an information extracting section in the system of FIG. 1, according to an exemplary embodiment.

The information extracting section 152 as a component of the computing unit 150 carries out a process of extracting information about the rear-seat occupant sitting in the rear seat based on the information form the image processing unit 130. Specifically, only image information corresponding to the upper area of the seat back of the vehicle rear seat is extracted (derived) from three-dimensional images of the image processing unit 130 by the information extracting section 152. The upper area of the seat back of the vehicle rear seat is shown in FIG. 3 as a reference. FIG. 3 shows an area A1 defined as the upper area of the seat back in the information extracting section 152 of this embodiment. The area A1 shown in FIG. 3 is an area defined by a horizontal plane S1 extending through the shoulders of the occupant sitting in the vehicle rear seat 12, a horizontal plane S2 extending above the head of the rear-seat occupant sitting in the vehicle rear seat 12, a vertical plane S3 extending in front of the head of the rear-seat occupant sitting in the vehicle rear seat 12, a vertical plane S4 extending behind the head of the rear-seat occupant sitting in the vehicle rear seat 12, and vertical planes S5, S6 extending on right and left sides of the seat back of the vehicle rear seat 12. The information extracting section 152 may be referred to as an image extracting section.

Figure 4:
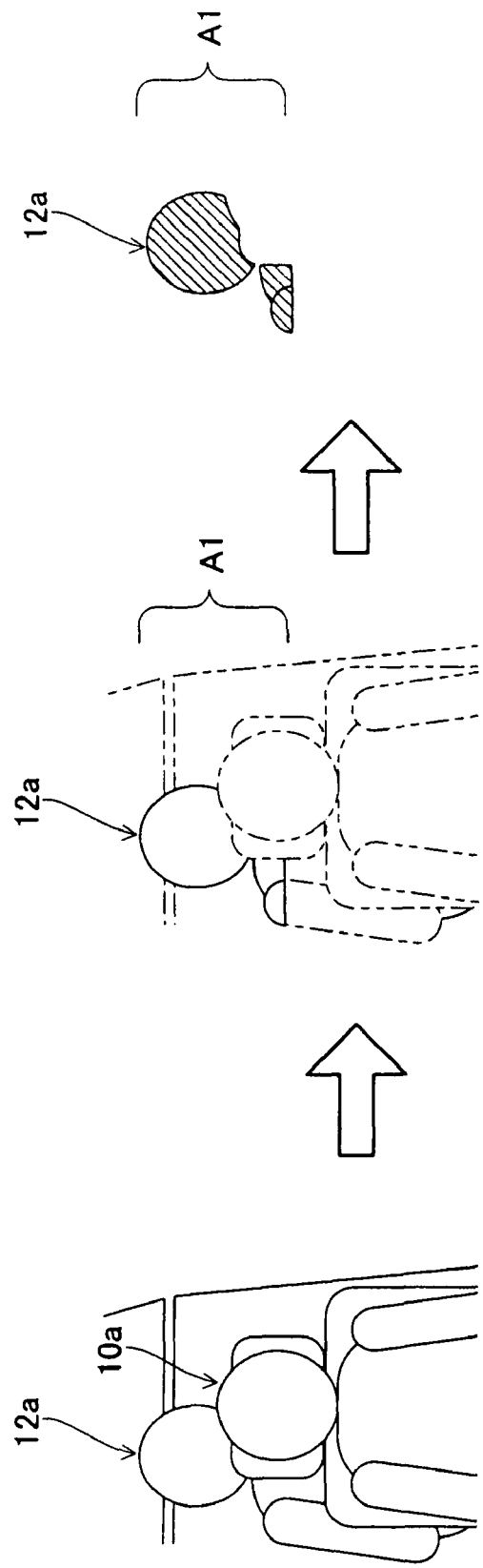
FIG. 4 is an illustration showing aspects in the information extracting process by the information extracting section of FIG. 3, according to an exemplary embodiment.

The information extracting process will be understood with reference to FIG. 4. FIG. 4 shows aspects in the information extracting process by the information extracting section 152. As shown in FIG. 4, in the information extracting process, an image corresponding to the area A1 is extracted from the photographed image D1. For example, an extraction processed image D3 may be derived through a semi-processed image D2.

The division processing section 154 as a component of the computing unit 150 has a function of dividing the image information extracted by the information extracting section 152 into regions or areas for respective occupants sitting in the vehicle rear seat. Specifically, in a case of a vehicle rear seat of which passenger capacity is two, the image information extracted by the information extracting section 152 is divided into two regions. In case of a vehicle rear seat of which passenger capacity is three, the image information extracted by the information extracting section 152 is divided into three regions. It should be understood that the information about the passenger capacity of the vehicle rear seat of the subject vehicle can be previously stored in the storing unit 170.

Figure 5:
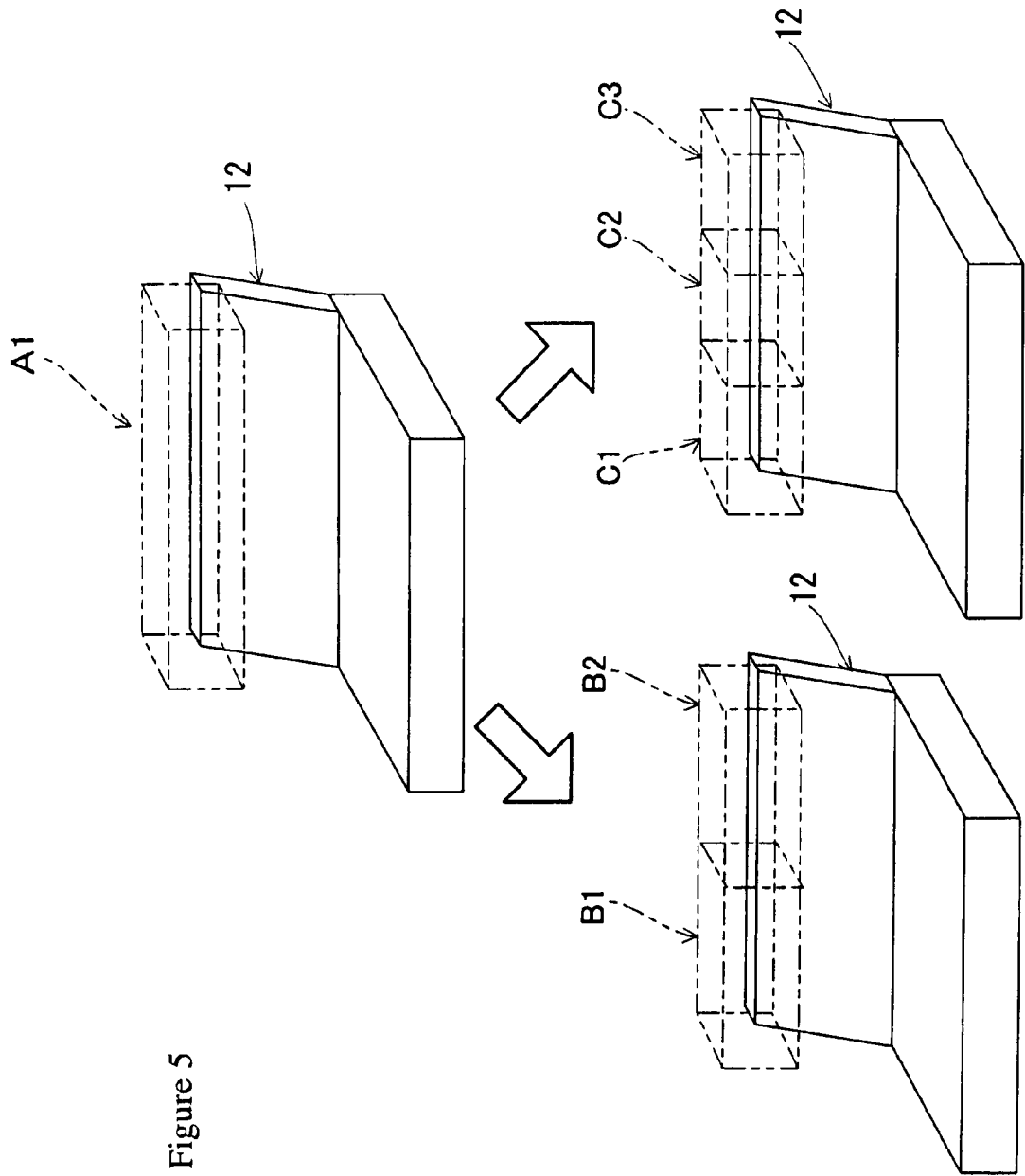
FIG. 5 is an illustration showing aspects in the process by a division processing section of the system of FIG. 1, according to an exemplary embodiment.

The process of the division processing section 154 will be further described with reference to FIG. 5. FIG. 5 shows aspects in the process by the division processing section 154 of this embodiment. As shown in FIG. 5, in case of a process for dividing the image information extracted by the information extracting section 152 into two regions, the area A1 is divided into two regions, i.e. divided regions B1 and B2. In case of a process for dividing the image information extracted by the information extracting section 152 into three regions, the region A1 is divided into three regions, i.e. divided regions C1 through C3. The divided regions formed by dividing region A1 are assumed as detection regions where features of a rear-seat occupant can be detected.

The histogram computing section 156, as a component of the computing unit 150, derives an occupied-state histogram when the seat is occupied and also derives a difference histogram showing a difference between the occupied-state histogram and an unoccupied-state histogram. The occupied-state histogram can be derived with regard to image information in each divided region obtained by the division processing section 154. The image information can include picture elements that correspond to objects imaged by the photographing device 110. The occupied-state histogram can show a frequency distribution of picture elements relative to distances that correspond to lengths between the imaged objects and the photographing device 110 or camera 112, with regard to image information in each divided region when the seat is actually occupied. On the other hand, the unoccupied-state histogram is a histogram showing frequency distribution of picture elements relative to the distances from the 3D camera 112 during the seat is unoccupied. The information about the unoccupied-state histogram is previously stored in the storing unit 170. The picture element used here is sometimes called a pixel which is a colored point as a unit composing a digital image, and may contain information about distance (depth), degree of transparency, and the like. A digital image is represented by a sheet of image composed of square or rectangular pixels which are aligned orderly lengthwise and crosswise. The histogram showing frequency distribution of picture elements relative to distances from the 3D camera 112 is made with an abscissa axis representing the distances from the 3D camera 112 and an ordinate axis representing the frequency (number) of picture elements corresponding to the distance from the 3D camera 112.

Figure 6:
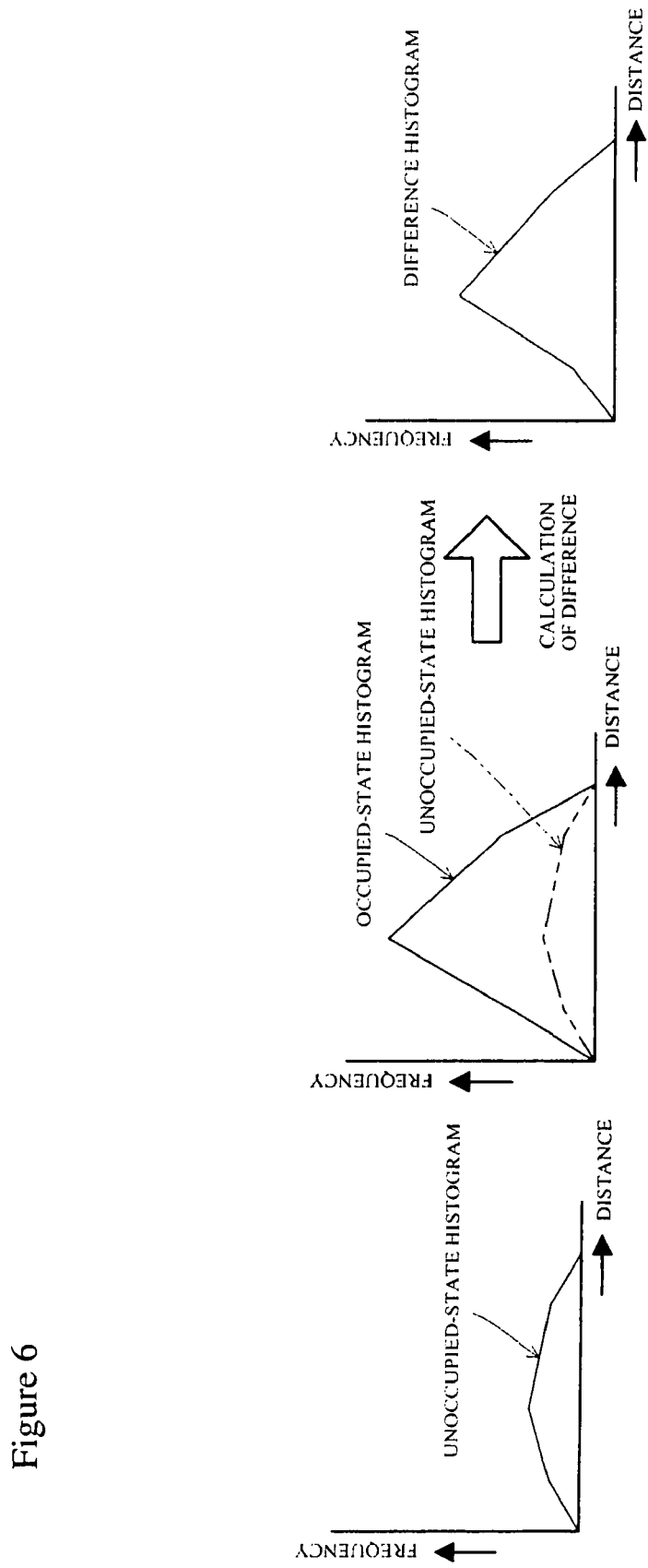
FIG. 6 is an illustration showing aspects in the process for deriving the difference histogram in a histogram computing section of the system of FIG. 1, according to an exemplary embodiment.

The deriving process of the difference histogram will be further described with reference to FIG. 6. FIG. 6 shows aspects in the process for deriving the difference histogram in the histogram computing section 156 of this embodiment. As shown in FIG. 6, in the process for deriving the difference histogram, the difference histogram is derived by deducting the unoccupied-state histogram from the occupied-state histogram. As for the derived difference histogram, the sum of differences in the difference histogram at a position where a rear-seat occupant is seated within the predetermined range from the 3D camera 112, that is, the frequency of picture elements within the predetermined range from the 3D camera 112, corresponds to a volume of an object detected in the divided region. The predetermined range from the 3D camera 112 is previously stored in the storing unit 170.

The determination processing section 158, as a component of the computing unit 150 determines, based on the information derived by the histogram computing section 156, whether or not the object detected in each divided region is a rear-seat occupant. Specifically, when the volume of the detected object computed by the histogram computing section 156 exceeds a preset value or is equal to or more than the preset value the determination processing section 158 determines that the object contains a rear-seat occupant, that is, the rear-seat occupant is seated. On the other hand, when the volume of the detected object computed by the histogram computing section 156 is equal to or less than the preset value or is below the preset value the determination processing section 158 determines that the object is not a rear-seat occupant, that is, no rear-seat occupant is seated (the seat is unoccupied). The determination process and the process for deriving the difference histogram as a pretreatment of the determination process are conducted for every divided region of the two or three divided regions obtained by the division processing section 154. The determination processing section 158 and the aforementioned histogram computing section 156 cooperate together to form the "derivation processing section" of the present invention.

The storing unit 170 of this embodiment can be a device or means for storing (recording) data for correction, buffer frame memory for preprocessing, defined data for recognition computing, reference patterns, and the computed results of the computing unit 150 as well as an operation control software.

The input/output unit 190 of this embodiment inputs information about the vehicle, information about traffic conditions around the vehicle, information about weather condition and about time zone as well as the determination results by the determination processing section 158 to the ECU 200 for conducting controls of the entire vehicle and outputs recognition results. As the information about the vehicle, there are, for example, collision prediction information of the vehicle by a radar or camera, the state (open or closed) of a vehicle door, the wearing of the seat belt, the operation of brakes, the vehicle speed, and the steering angle. In this embodiment, based on the information outputted from the input/output unit 190, the ECU 200 outputs actuation control signals to the operation device 210. The input/output unit 190 may be of any structure capable of outputting a control signal to the operation device 210. As shown in FIG. 1, the input/output unit 190 may output a control signal to the operation device 210 indirectly through the ECU 200 or may directly output a control signal to the operation device 210.

According to the occupant detection apparatus 100 of this embodiment, as mentioned above, it is possible to precisely detect information about the rear-seat occupant(s) sitting in the vehicle rear seat 12 by conducting the respective processes based on three-dimensional images taken by the 3D camera 112. That is, in case of using three-dimensional images, it ensures a high degree of precision in detection as compared to the case of using two-dimensional images because information can be extracted according to distances even when there is a small difference in color between the background and the rear-seat occupant or a small difference in color between the skin and the clothes.

Figure 7:
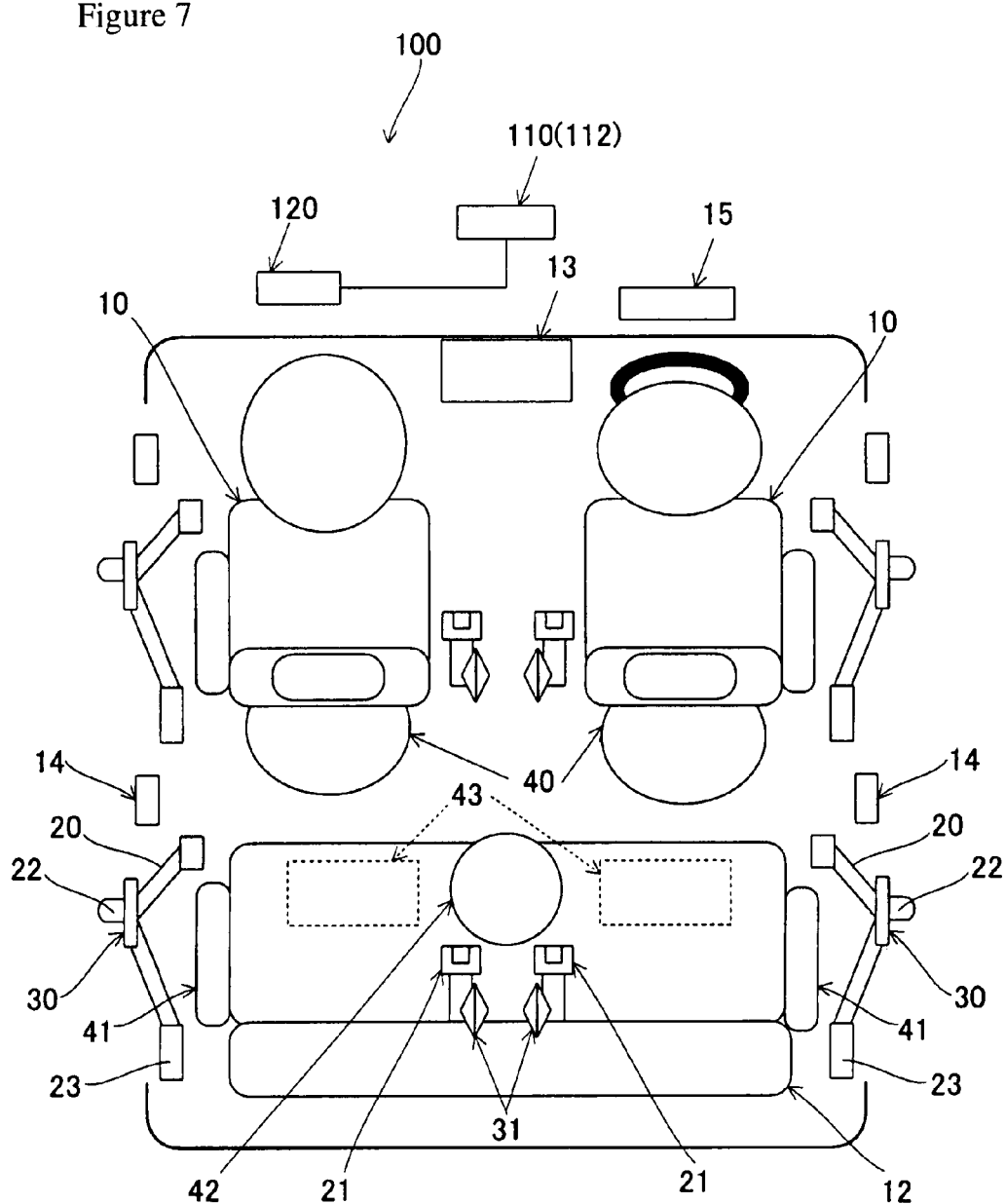
FIG. 7 is an illustration showing a structure of a vehicle on which the occupant detection apparatus shown in FIG. 1 is mounted, according to an exemplary embodiment.

As the operation device 210 of this embodiment, any component of seat belt apparatuses of the following embodiments or an airbag apparatus may be employed. The seat belt apparatus and the airbag apparatus used here may constitute an operation device control system. Specific embodiments of the seat belt apparatus and the airbag apparatus will be described with reference to FIG. 7. FIG. 7 shows a structure of a vehicle on which the occupant detection apparatus 100 shown in FIG. 1 is mounted.

As a first embodiment, a first seat belt apparatus is provided which has an informing function of informing the rear-seat occupant of the positions of a seat belt buckle 21 and a tongue 22 for a seat belt 20 worn by the rear-seat occupant or the selection of the seat belt buckle 21 and the tongue 22, using information about the rear-seat occupant (the presence or absence of occupant, the seated position of the occupant) or information about loading of the occupant and the information about opening or closing of a vehicle door. The informing action may be carried out by lightening the seat belt buckle 21 itself and the tongue 22 itself, protruding the seat belt buckle 21, sending out the tongue 22, sliding the tongue 22 up and down, or displaying on a monitor panel 13. The informing function used here can compose an informing section. It should be noted that the information about opening or closing of the vehicle door is detected by a vehicle door sensor 14.

By using the seat belt apparatus having the aforementioned structure, the rear-seat occupant sitting in the vehicle rear seat can be informed of the existence of the seat belt buckle and the tongue. This can increase the recognition of the existence of the seat belt buckle and the tongue and is thus effective in increasing the seat belt wearing rate by rear-seat occupants.

As a second embodiment, a second seat belt apparatus is provided which has an informing function of informing a driver of the seat belt wearing completion (wearing state) of the rear-seat occupant, using information about the rear-seat occupant (the presence or absence of the occupant, the seated position of the occupant). The informing action may be carried out by displaying on the monitor panel 13 or a meter panel 15 or outputting voice guidance from a speaker. The informing function used here can compose the informing section.

By using the seat belt apparatus having the aforementioned structure, it can urge front-seat occupants including the driver and the rear-seat occupant(s) to wear the seat belt when the rear-seat occupant(s) sitting in the vehicle rear seat does not wear the seat belt.

As a third embodiment, a third seat belt apparatus is provided which has an informing function of informing the driver or the rear-seat occupant of whether or not a tongue 22 is latched with a right seat belt buckle 21, using information about the rear-seat occupant (the presence or absence of the occupant, the seated position of the occupant). The informing action may be carried out by displaying on the monitor panel 13 or a meter panel 15 or voice output, or lightening or vibrating a certain portion. The informing function used here can be performed by an informing section.

By using the seat belt apparatus having the aforementioned structure, it can prevent wrong buckling such as a case that the tongue for the left side rear-seat occupant is latched with the seat belt buckle for the right side rear-seat occupant, thereby exhibiting the original occupant restraining function of the seat belt.

As a fourth embodiment, a fourth seat belt apparatus is provided which has a seat belt load reducing function for reducing the seat belt load acting on the rear-seat occupant via the seat belt 20, using information about the rear-seat occupant (the presence or absence of the occupant, the seated position of the occupant). The seat belt load reducing function may be carried out by protruding the seat belt buckle 21, sending out the tongue 22, or driving another member (seat belt reacher) acting on the seat belt 20 by a driving device 30 or 31. By using the seat belt apparatus having the aforementioned structure, the seat belt load acting on the rear-seat occupant via the seat belt 20 can be reduced, thereby suitably restraining the rear-seat occupant by the seat belt 20.

As a fifth embodiment, a fifth seat belt apparatus is provided which actuates a pretensioner 23 for winding up the seat belt 20 to remove any slack of the seat belt 20 in the event of a vehicle collision, using information about the rear-seat occupant (the presence or absence of the occupant, the seated position of the occupant) and, as another information, information about buckling between the seat belt buckle and the tongue. By using the seat belt apparatus as mentioned above, the pretensioner 23 can be suitably actuated to wind up the seat belt 20 to remove the slack of the seat belt 20 in the event of a vehicle collision, thereby improving the occupant restraining property by the seat belt.

As a sixth embodiment, an operation device is provided which has a function of actuating an airbag for restraining a rear-seat occupant, using information about the rear-seat occupant (the presence or absence of the occupant, the seated position of the occupant). The operation device may be composed of an airbag 40 which is disposed in a portion under the vehicle front seat 10 or in a cabin ceiling and can be deployed in front of the rear-seat occupant in the event of a vehicle collision, a side airbag 41 which can be deployed at a door side of the rear-seat occupant in the event of a vehicle collision, or an intermediate airbag 42 which can be deployed between the rear-seat occupants in the event of a vehicle collision. Further, the operation device may be composed of a limiting device 43 which rises a seat cushion of the vehicle rear seat 12 by an airbag or another actuating mechanism in order to prevent a phenomenon that the rear-seat occupant tends to slide along the seat surface below the seat belt (the so-called "submarine phenomenon"), or a device which provides a curtain-like member between the vehicle front seats 10 and the vehicle rear seat 12 to partition them in order to prevent the rear-seat occupant and/or an object such as baggage from moving forward. By using the operation device as mentioned above, an occupant restraining device or means such as the airbag 40 and a side airbag 41 can be properly actuated in the event of a vehicle collision, thereby improving the occupant restraint property.

As another embodiment, there may be provided a device for locking the seat belt when a child seat is attached or a device for informing thereof, using information about the rear-seat occupant (the presence or absence of the occupant, the seated position of the occupant), and/or a device for locking a door when a small-size occupant such as a child is seated or when a child seat is attached or a device for informing thereof, using the aforementioned information about the rear-seat occupant.

According to the occupant detection apparatus 100 of this embodiment, as discussed above, there can be provided a seat belt apparatus and/or an airbag apparatus capable of controlling using information about the rear-seat occupant in the vehicle rear seat 12 precisely detected by the respective processes based on the three-dimensional images taken by the 3D camera 112. In addition, there can also be provided a vehicle to which such a seat belt apparatus and/or such an airbag apparatus are mounted.

The priority application, Japanese Patent Application No. 2006-316138 is incorporated by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An occupant detection apparatus, comprising:
    a photographing device configured to face a vehicle rear seat in a vehicle cabin for taking three-dimensional images; and
    a control device that includes:
        an information extracting section configured to extract image information corresponding to an upper area of a seat back of said vehicle rear seat from the three-dimensional images taken by said photographing device;
        a division processing section configured to divide the information extracted by said information extracting section into regions corresponding to respective rear seat sitting areas for a plurality of rear-seat occupants; and
        a derivation processing section configured to derive information about each rear-seat occupant in each rear seat sitting area by comparing extracted image information for each region to a state in which the sitting area is unoccupied.

2. The occupant detection apparatus of claim 1, wherein the derivation processing section is configured to compare the extracted image information for each region to the unoccupied state by determining a difference between the extracted image information and the unoccupied state,
    wherein the derivation processing section is further configured to compare the determined difference to a preset value to derive the information about each rear-seat occupant in each rear seat sitting area.

3. The occupant detection apparatus of claim 1, wherein the extracted image information includes picture elements that correspond to objects imaged by the photographing device,
    wherein the extracted image information includes distances that correspond to lengths between the imaged objects and the photographing device, and a frequency of picture elements that occur for each distance.

4. The occupant detection apparatus of claim 3, wherein the derivation processing section is configured to compare the extracted image information by deriving a first histogram of the frequency of picture elements for each distance.

5. The occupant detection apparatus of claim 4, wherein the derivation processing section is configured to derive a difference histogram by deducting a second histogram from the first histogram, wherein the second histogram corresponds to the state in which the seat area or rear seat is unoccupied,
    wherein the derivation processing section is further configured to compare the difference histogram to a preset value to derive the information about each rear-seat occupant in each rear seat sitting area.

6. The occupant detection apparatus of claim 5, wherein the derivation processing section includes a histogram computing section and a determination processing section,
    wherein the histogram computing section is configured to derive the first histogram and the difference histogram,
    wherein the determination processing section is configured to compare the difference histogram to the preset value to derive the information about each rear-seat occupant in each rear seat sitting area.

7. The occupant detection apparatus of claim 1, wherein the information about each rear-seat occupant in each rear seat sitting area comprises the existence of a rear-seat occupant.

8. An operation device control system, comprising:
    an occupant information detecting section configured to detect information about a rear-seat occupant sitting in a vehicle rear seat; and
    an operation device configured to be actuated according to a detection result of said occupant information detecting section,
    wherein said occupant information detecting section includes an occupant detection apparatus as claimed in claim 1, wherein said operation device is configured to be actuated according to information derived by said occupant detection apparatus.

9. A seat belt system for installation in a vehicle, comprising:
    an occupant detection apparatus as claimed in claim 1;
    a seat belt configured to be worn by a rear seat occupant sitting in a vehicle rear seat to restrain the rear-seat occupant;
    a seat belt buckle configured to be installed in a sitting area of said vehicle rear seat;
    a tongue attached to said seat belt and configured to be latched with said seat belt buckle during a seat belt wearing state; and
    an informing section configured to provide the position of at least one of said seat belt buckle and said tongue installed for each sitting area where an occupant is sitting, based on information derived by said occupant detection apparatus.

10. The seat belt system of claim 9, wherein said informing section is configured to provide positions of said seat belt buckle and said tongue to the occupants of the sitting areas.

11. A seat belt system which is installed in a vehicle, comprising:
- an occupant detection apparatus as claimed in claim 1;
- a seat belt configured to be worn by a rear seat occupant sitting in a vehicle rear seat to restrain the rear-seat occupant;
- a seat belt buckle configured to be installed in each sitting area of said vehicle rear seat;
- a tongue attached to said seat belt and configured to be latched with said seat belt buckle during a seat belt wearing state;
- a buckle detecting sensor configured to detect that said tongue is latched with said seat belt buckle; and
- an output section configured to output the wearing of said seat belt installed in each sitting area where an occupant is sitting, based on information derived by said occupant detection apparatus and the detection result by said buckle detecting sensor.

* * * * *